US008452634B2

(12) United States Patent
Ramasamy

(10) Patent No.: US 8,452,634 B2
(45) Date of Patent: May 28, 2013

(54) METHOD AND SYSTEM FOR ASSESSING THE PROGRESS OF A PROJECT IN TERMS OF ITS SCHEDULE

(75) Inventor: Manikandan Ramasamy, Bangalore (IN)

(73) Assignee: Infosys Limited (IN)

( * ) Notice: Subject to any disclaimer, the term of this patent is extended or adjusted under 35 U.S.C. 154(b) by 170 days.

(21) Appl. No.: 12/788,399

(22) Filed: May 27, 2010

(65) Prior Publication Data
US 2011/0112883 A1    May 12, 2011

(30) Foreign Application Priority Data

Nov. 12, 2009 (IN) .......................... 2781/CHE/2009

(51) Int. Cl.
*G06Q 10/00* (2012.01)
(52) U.S. Cl.
USPC ........ 705/7.23; 705/7.12; 705/7.22; 705/7.38
(58) Field of Classification Search
USPC ................... 705/7.11, 7.12, 7.13, 7.15, 7.17, 705/7.22, 7.23, 7.25, 7.26, 35, 301
See application file for complete search history.

(56) References Cited

U.S. PATENT DOCUMENTS

| 5,381,332 | A  | * | 1/1995  | Wood ........................ 705/7.25 |
| 8,108,238 | B1 | * | 1/2012  | Cassone et al. ............ 705/7.13 |
| 2002/0082889 | A1 | * | 6/2002 | Oliver ............................. 705/8 |
| 2004/0030992 | A1 | * | 2/2004 | Moisa et al. .................. 715/513 |
| 2004/0068419 | A1 | * | 4/2004 | Salwitz et al. .................... 705/1 |
| 2005/0222881 | A1 | * | 10/2005 | Booker ............................ 705/7 |
| 2006/0173762 | A1 | * | 8/2006 | Clater ........................... 705/35 |
| 2008/0082389 | A1 | * | 4/2008 | Gura ................................. 705/9 |

OTHER PUBLICATIONS

Walt Lipke, Ofer Zwikael, Kym Henderson, and Frank Anbari. Prediction of Project outcome—The applicaiton of statistical method to earned value management and earned schedule performance indexes. International Journal of Project Management 27 (2009) 400-407. Retrieved from www.elsevier.com.*

* cited by examiner

*Primary Examiner* — Jonathan G Sterrett
*Assistant Examiner* — Stephanie Delich
(74) *Attorney, Agent, or Firm* — Cantor Colburn LLP

(57) ABSTRACT

The invention describes a computer-implemented method and system for assessing the progress of a project in terms of its schedule. The method includes receiving project data and based on the project data, calculating a first period (PE) after which a current earned value (EV) was expected to be realized. The method also includes calculating a second period (PR) in which the current EV has been realized. Further, the method includes calculating a fraction component (EF) of a period when the current EV was expected to be realized and finally, calculating an earned schedule performance index (ESPI) based on PE, PR and EF, wherein the ESPI indicates whether the project is on schedule.

12 Claims, 6 Drawing Sheets

FIG. 3

| Week # | Start | End | Status Date | PV | EV | PVp | SDp | PVw | PE | PR | EF | SPI | ESPI |
|---|---|---|---|---|---|---|---|---|---|---|---|---|---|
| 1 | 9/26/2007 | 1/22/2008 | 10/7/2007 | 144.50 | 119.67 | 100.64 | 10/3/2007 | 126.14 | 8.00 | 12.00 | 0.75 | 0.83 | 0.73 |
| 2 | 9/26/2007 | 1/22/2008 | 10/14/2007 | 314.50 | 316.52 | 287.64 | 10/11/2007 | 321.64 | 16.00 | 19.00 | 0.85 | 1.01 | 0.89 |
| 3 | 9/26/2007 | 1/22/2008 | 10/21/2007 | 450.00 | 440.00 | 423.64 | 10/17/2007 | 457.64 | 22.00 | 26.00 | 0.48 | 0.98 | 0.86 |
| 4 | 9/26/2007 | 1/22/2008 | 10/28/2007 | 621.00 | 596.00 | 593.63 | 10/25/2007 | 627.63 | 30.00 | 33.00 | 0.07 | 0.96 | 0.91 |
| 5 | 9/26/2007 | 1/22/2008 | 11/11/2007 | 807.48 | 734.88 | 729.63 | 11/1/2007 | 755.13 | 37.00 | 47.00 | 0.21 | 0.91 | 0.79 |
| 6 | 9/26/2007 | 1/22/2008 | 11/18/2007 | 934.00 | 792.00 | 789.13 | 11/6/2007 | 806.13 | 42.00 | 54.00 | 0.17 | 0.85 | 0.78 |
| 7 | 9/26/2007 | 1/22/2008 | 11/25/2007 | 1147.48 | 1025.62 | 984.63 | 11/19/2007 | 1027.13 | 55.00 | 61.00 | 0.96 | 0.89 | 0.92 |
| 8 | 9/26/2007 | 1/22/2008 | 12/2/2007 | 1360.00 | 1330.00 | 1324.63 | 11/29/2007 | 1367.13 | 65.00 | 68.00 | 0.13 | 0.98 | 0.96 |
| 9 | 9/26/2007 | 1/22/2008 | 12/9/2007 | 1572.00 | 1574.00 | 1537.13 | 12/6/2007 | 1579.63 | 72.00 | 75.00 | 0.87 | 1.00 | 0.97 |
| 10 | 9/26/2007 | 1/22/2008 | 12/16/2007 | 1780.00 | 1790.00 | 1748.26 | 12/13/2007 | 1790.42 | 79.00 | 82.00 | 0.99 | 1.01 | 0.98 |
| 11 | 9/26/2007 | 1/22/2008 | 12/23/2007 | 1985.00 | 1995.00 | 1956.34 | 12/20/2007 | 1996.54 | 86.00 | 89.00 | 0.96 | 1.01 | 0.98 |
| 12 | 9/26/2007 | 1/22/2008 | 12/30/2007 | 2142.00 | 2084.00 | 2076.95 | 12/26/2007 | 2115.79 | 92.00 | 96.00 | 0.18 | 0.97 | 0.96 |
| 13 | 9/26/2007 | 1/22/2008 | 1/6/2008 | 2276.00 | 2293.00 | 2282.05 | 1/6/2008 | 2303.23 | 103.00 | 103.00 | 0.52 | 1.01 | 1.01 |
| 14 | 9/26/2007 | 1/22/2008 | 1/13/2008 | 2358.00 | 2344.00 | 2332.33 | 1/9/2008 | 2348.74 | 106.00 | 110.00 | 0.71 | 0.99 | 0.97 |
| 15 | 9/26/2007 | 1/22/2008 | 1/20/2008 | 2440.00 | 2361.00 | 2348.74 | 1/10/2008 | 2365.14 | 107.00 | 117.00 | 0.75 | 0.97 | 0.92 |
| 16 | 9/26/2007 | 1/22/2008 | 1/27/2008 | 2470.00 | 2470.00 | 2463.57 | 1/21/2008 | 2477.02 | 118.00 | 124.00 | 0.48 | 1.00 | 0.96 |

300

| Week # | Start | End | Status Date | PV | EV | PVp | SDp | PVw | PE | PR | EF | SPI | ESPI |
|---|---|---|---|---|---|---|---|---|---|---|---|---|---|
| 1 | 5/25/2009 | 8/14/2009 | 5/31/2009 | 1529.27 | 1857.02 | 1571.42 | 5/31/2009 | 1885.71 | 7.00 | 7.00 | 0.91 | 1.21 | 1.13 |
| 2 | 5/25/2009 | 8/14/2009 | 6/7/2009 | 3058.55 | 3925.20 | 3771.42 | 6/9/2009 | 4077.20 | 16.00 | 14.00 | 0.50 | 1.28 | 1.18 |
| 3 | 5/25/2009 | 8/14/2009 | 6/14/2009 | 4587.82 | 6183.83 | 6175.23 | 6/21/2009 | 6472.52 | 28.00 | 21.00 | 0.03 | 1.35 | 1.33 |
| 4 | 5/25/2009 | 8/14/2009 | 6/21/2009 | 6115.95 | 7095.47 | 7067.10 | 6/24/2009 | 7364.39 | 31.00 | 28.00 | 0.10 | 1.16 | 1.11 |
| 5 | 5/25/2009 | 8/14/2009 | 6/28/2009 | 7644.95 | 8105.02 | 7967.47 | 6/29/2009 | 8273.26 | 36.00 | 35.00 | 0.45 | 1.06 | 1.04 |
| 6 | 5/25/2009 | 8/14/2009 | 7/5/2009 | 9216.62 | 10365.20 | 10159.56 | 7/8/2009 | 10473.95 | 45.00 | 42.00 | 0.65 | 1.12 | 1.09 |
| 7 | 5/25/2009 | 8/14/2009 | 7/12/2009 | 10788.57 | 11546.97 | 11417.13 | 7/14/2009 | 11731.52 | 51.00 | 49.00 | 0.41 | 1.07 | 1.05 |
| 8 | 5/25/2009 | 8/14/2009 | 7/19/2009 | 12360.55 | 13133.68 | 12989.15 | 7/21/2009 | 13303.62 | 58.00 | 56.00 | 0.46 | 1.06 | 1.04 |
| 9 | 5/25/2009 | 8/14/2009 | 7/26/2009 | 13932.80 | 14070.82 | 13932.54 | 7/26/2009 | 14247.02 | 63.00 | 63.00 | 0.44 | 1.01 | 1.01 |

METHOD AND SYSTEM FOR ASSESSING THE PROGRESS OF A PROJECT IN TERMS OF ITS SCHEDULE

BACKGROUND

The present invention generally relates to project management. More specifically, it relates to assessing the performance of a project in terms of its schedule.

Calculating schedule of a project based on earned value management (EVM) is a primary factor used to track projects. As is known in the art, EVM is a technique where a project plan, actual work planned till date and work-completed value are monitored to see whether a project is on track. Thus, typically, the essential features of an EVM implementation include:

a. a project plan identifying the work to be accomplished;
b. an estimated value of work to be accomplished within a fixed period, called planned value (PV); and
c. a budgeted cost of work performed, called earned value (EV).

Based on the EV and the PV defined above, for any project, an index called a schedule performance index (SPI) is calculated that helps in assessing whether the project is on schedule. Typically, the SPI is calculated using the formula SPI=(EV/PV). An SPI of 1 indicates that the project is on schedule, an SPI greater than 1 indicates that the project is ahead of schedule, while an SPI less than 1 indicates that the project is behind schedule.

Though the SPI gives a fair idea of how the project is progressing, it is not fully accurate. This is because the SPI does not consider the time factor while arriving at the index. For example, consider a project that was scheduled to finish in 16 weeks but instead, finished in 17 weeks. In this case, at the end of 17 weeks, the EV will be equal to PV, and hence, the SPI will be equal to 1. This is misleading, because though the SPI shows a value of 1, which indicates that the project is on schedule, the project was actually delayed by one week. As in this case, the indication provided by the SPI is usually on the upper side, which can be risky when followed blindly. This limitation is not just at the end of the project but exists throughout the execution of the project, thereby providing a misleading index.

In light of the foregoing, there exists a need for an improved schedule performance index that considers the time factor in assessing the progress of a project. Further, this index should be accurate throughout the duration of the project.

SUMMARY

The invention describes a computer-implemented method for assessing the progress of a project in terms of its schedule. The method includes receiving project data and based on the project data, calculating a first period (PE) after which a current earned value (EV) was expected to be realized. The method also includes calculating a second period (PR) in which the current EV has been realized. Further, the method includes calculating a fraction component (EF) of a period when the current EV was expected to be realized and finally, calculating an earned schedule performance index (ESPI) based on PE, PR and EF, wherein the ESPI indicates whether the project is on schedule.

The invention describes a system for assessing the progress of a project in terms of its schedule. The system includes a database for storing project data. The system also includes a processor for accessing the project data stored in the database and based on the project data, calculating a first period (PE) after which a current earned value (EV) was expected to be realized. The processor also calculates a second period (PR) in which the current EV has been realized. Further, the processor calculates a fraction component (EF) of a period when the current EV was expected to be realized. Finally, the processor calculates an earned schedule performance index (ESPI) based on PE, PR and EF, wherein the ESPI indicates whether the project is on schedule. The system further includes a storage module for storing the calculated values of at least PE, PR, EF and ESPI. The system also includes a reporting module for generating reports based on the calculated values of PE, PR, EF and ESPI.

BRIEF DESCRIPTION OF THE DRAWINGS

The various embodiments of the invention will hereinafter be described in conjunction with the appended drawings, provided to illustrate and not to limit the invention, wherein like designations denote like elements, and in which:

FIG. 3 is an example of a report 300 showing earned schedule performance index for an actual project, in accordance with an embodiment of the present invention;

FIG. 5 is an example of a report 500 showing earned schedule performance index for an actual project, in accordance with an embodiment of the present invention.

DESCRIPTION OF VARIOUS EMBODIMENTS

The invention describes a computer-implemented method for assessing the progress of a project in terms of its schedule. The method includes receiving project data and based on the project data, calculating a first period (PE) after which a current earned value (EV) was expected to be realized. The method also includes calculating a second period (PR) in which the current EV has been realized. Further, the method includes calculating a fraction component (EF) of a period when the current EV was expected to be realized and finally, calculating an earned schedule performance index (ESPI) based on PE, PR and EF, wherein the ESPI indicates whether the project is on schedule.

The invention describes a system for assessing the progress of a project in terms of its schedule. The system includes a database for storing project data. The system also includes a processor for accessing the project data stored in the database and based on the project data, calculating a first period (PE) after which a current earned value (EV) was expected to be realized. The processor also calculates a second period (PR) in which the current EV has been realized. Further, the processor calculates a fraction component (EF) of a period when the current EV was expected to be realized. Finally, the processor calculates an earned schedule performance index (ESPI) based on PE, PR and EF, wherein the ESPI indicates whether the project is on schedule. The system further includes a storage module for storing the calculated values of at least PE, PR, EF and ESPI. The system also includes a reporting module for generating reports based on the calculated values of PE, PR, EF and ESPI.

A list of terms used herein and their definitions are given below:

Planned Value (PV): Indicates hours/cost of work that is actually planned to complete till that period.

Earned Value (EV): Indicates hours/cost of work that is actually completed till that period.

Schedule Performance Index (SPI): Indicates performance of the project with respect to the schedule; a value of 1 means the project is on schedule, less than 1 means that the project is behind the schedule, greater than 1 means the project is ahead of schedule. SPI is calculated using the formula EV/PV.

Status Date (SD): Date of current status report.

Planned Value (Previous) (PVp): PV of the period immediately preceding the one in which the current earned value was expected to be realized.

Status Date (Previous) (SDp): Status date attached to the PVp.

Planned Value (When) (PVw): PV of the period in which the current EV was expected to be realized.

Start: Start date of the project.

Period Expected (PE): The period after which the current EV was expected to be realized (usually expressed in terms of days).

Period Realized (PR): The period in which the current EV has been actually realized (usually expressed in terms of days).

Earned Factor (EF): The fraction component of the day when the current EV was expected to be realized.

Figure 1:
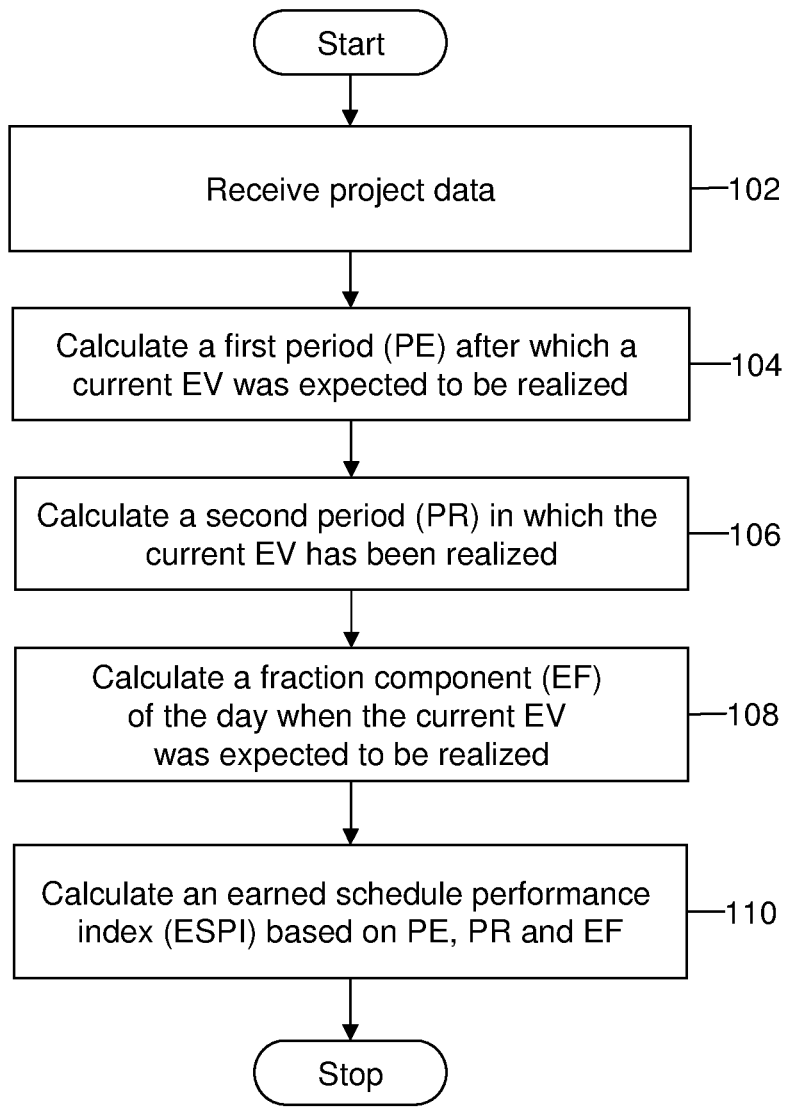
FIG. 1 is a flowchart of a method for calculating earned schedule performance index for a project, in accordance with an embodiment of the present invention.

FIG. 1 is a flowchart of a method for calculating earned schedule performance index for a project, in accordance with an embodiment of the present invention. At step 102, project data is received. In accordance with an embodiment, the project data may be accessed from a database. At step 104, a first period (PE) after which a current EV was expected to be realized is calculated. In accordance with various embodiments of the present invention, the PE is calculated as PE=SDp−START+1.

At step 106, a second period (PR) in which the current EV has been realized is calculated. In accordance with various embodiments of the present invention, the PR is calculated as PR=SD−START+1.

At step 108, a fraction component (EF) of the day when the current EV was expected to be realized is calculated. In accordance with various embodiments of the present invention, the EF is calculated as EF=(EV−PVp)/(PVw−PVp).

At step 110, an earned schedule performance index (ESPI) is calculated based on PE, PR and EF. In accordance with various embodiments of the present invention, the ESPI is calculated as ESPI=(EF+PE)/PR.

Figure 2:
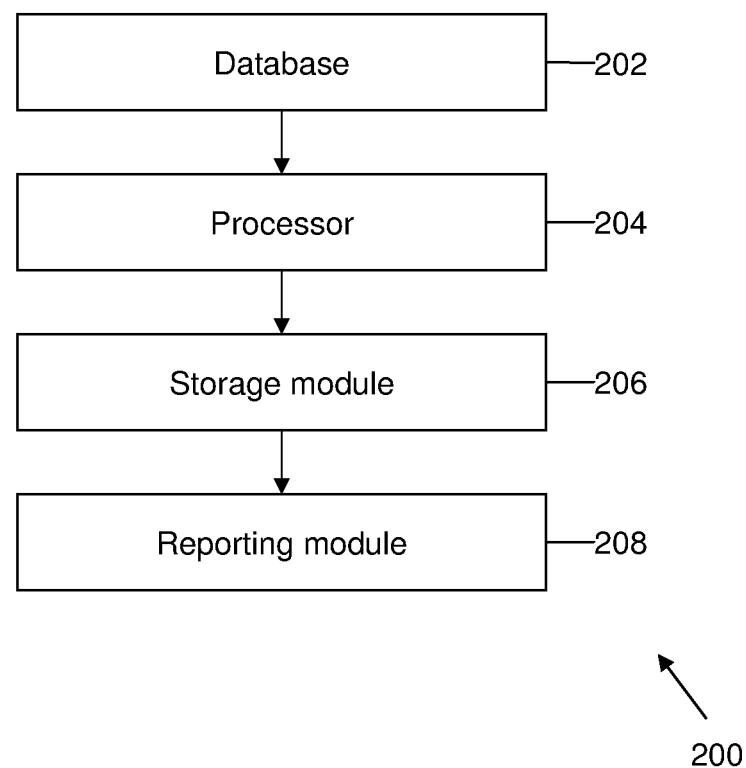
FIG. 2 is a block diagram of a system 200 for calculating earned schedule performance index for a project, in accordance with an embodiment of the present invention.

FIG. 2 is a block diagram of a system 200 for calculating earned schedule performance index for a project, in accordance with an embodiment of the present invention. System 200 includes a database 202, a processor 204, a storage module 206 and a reporting module 208.

Database 202 stores details of all projects—ongoing, completed and so forth. For example, database 202 may be a central database within an organization that stores the details of all projects currently being undertaken within various departments of the organization. In accordance with an embodiment of the present invention, the details of projects include, but are not limited to, start date, end date, total available cost, and so forth. Database 202 may include any known type of data storage, including optical media, magnetic media, random access memory (RAM), read only memory (ROM), a data cache, and so forth.

Processor 204 accesses database 202 to gather the details of the project. Based on the project details, processor 204 calculates a first period (PE) after which a current earned value (EV) was expected to be realized. In accordance with various embodiments of the present invention, processor 204 calculates the first period using the formula: PE=SDp−START+1. The first period may be calculated in terms of any predefined unit of time including months, weeks, days, hours, minutes and seconds. Processor 204 then calculates a second period (PR) in which the current EV has been realized using the formula: PR=SD−START+1. It should be noted that the second period is also calculated in terms of the predefined unit of time as discussed earlier.

Processor 204 then calculates a fraction component (EF) of a period when the current EV was expected to be realized. In accordance with various embodiments of the present invention, processor 204 calculates the EF using the formula: EF=(EV−PVp)/(PVw−PVp). Finally, based on the values of PE, PR and EF, processor 204 calculates the ESPI using the formula ESPI=(EF+PE)/PR.

Storage module 206 stores the various calculated values of PE, PR, EF, SPI, ESPI and so forth. It will be apparent that any other similar value may also be calculated by processor 204 and stored in storage module 206. These values may then be used for any further analysis such as, for example, to generate a report. It should be noted that though storage module 206 and database 202 have been shown and referenced to separately in the figure, storage module 206 may be a part of database 202.

Reporting module 208 may generate various reports based on data stored in storage module 206. In accordance with an embodiment of the present invention, a report may include various fields such as start date, end date, status date, budget at completion, buffer cost, total available cost, planned value, earned value, actual cost, estimated defects, captured defects, projected defects, planned percentage complete, actual percentage complete, schedule performance index, earned schedule performance index, and so forth. Reporting module 208 may also generate graphs showing a comparison between two or more of the above mentioned fields.

FIG. 3 is an example of a report 300 showing the earned schedule performance index for an actual project, in accordance with various embodiments of the present invention. It should be noted that this project was scheduled to be completed in 16 weeks while it was actually completed in 17 weeks. Report 300 includes various fields such as week number, start date, end date, status date, PV, EV, PVp, SDp, PVw, PE, PR, EF, SPI and ESPI. As explained before, the ESPI is calculated using the formula ESPI=(EF+PE)/PR and is an accurate indicator of the performance of the project in terms of its schedule.

As shown in the figure, for various status dates lying between the start date and the end date of the project, corresponding values of PV, EV, PVp, SDp, PVw, PE, PR, EF, SPI and ESPI are calculated. In accordance with an embodiment of the present invention, the PV may be calculated by any of various methods, such as, for example, by writing a suitable program in a programming language such as Visual Basic. Further, PE, PR, EF and ESPI are calculated using formulae disclosed earlier. As can be observed from the figure, the SPI is usually on the upper side as compared to the ESPI. As mentioned earlier, the project was scheduled to be completed in 16 weeks while it was actually completed in 17 weeks. It should be noted that, at the end of 17 weeks, the SPI shows a value of 1, which is misleading, while the ESPI shows a value of 0.96, which is accurate because the project was delayed by one whole week.

Figure 4:
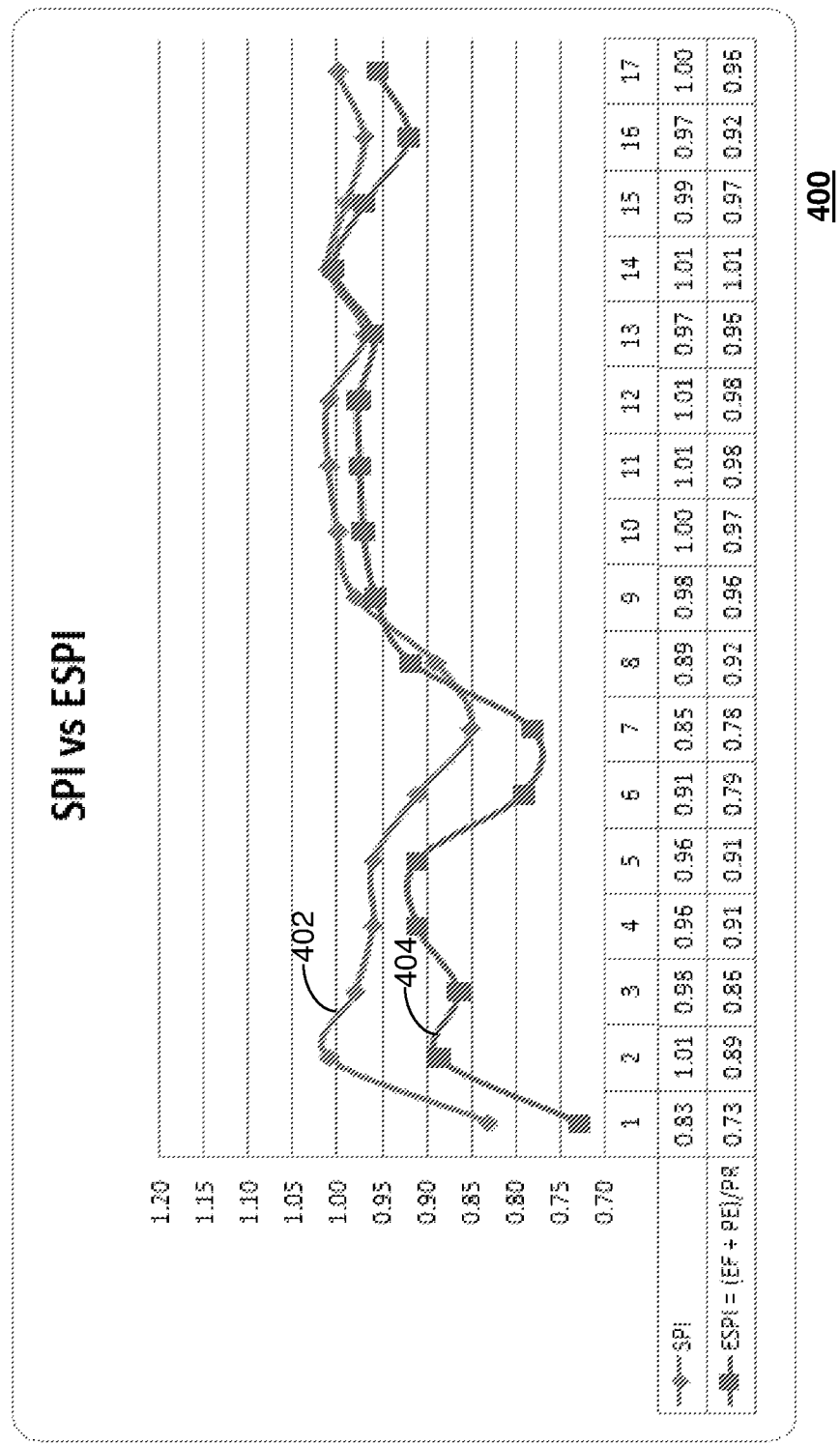
FIG. 4 is a graph 400 showing the comparison between earned schedule performance index and schedule performance index, in accordance with an embodiment of the invention.

FIG. 4 is a graph 400 showing the comparison between earned schedule performance index and schedule performance index, in accordance with an embodiment of the invention. Graph 400 includes curve 402 and curve 404 representing values of SPI and ESPI respectively for the project discussed in FIG. 3. It should be noted that this graph implies a re-baseline done in week 9 and week 13. As can be observed, for most part of the graph, the SPI is greater than the ESPI. The ESPI provides a more realistic picture of the performance of the project with respect to its schedule.

FIG. 5 is an example of a report 500 showing the earned schedule performance index for an actual project, in accordance with an embodiment of the present invention. Report 500 includes fields similar to the ones in FIG. 3, namely, week number, start date, end date, status date, PV, EV, PVp, SDp, PVw, PE, PR, EF, SPI and ESPI.

Figure 6:
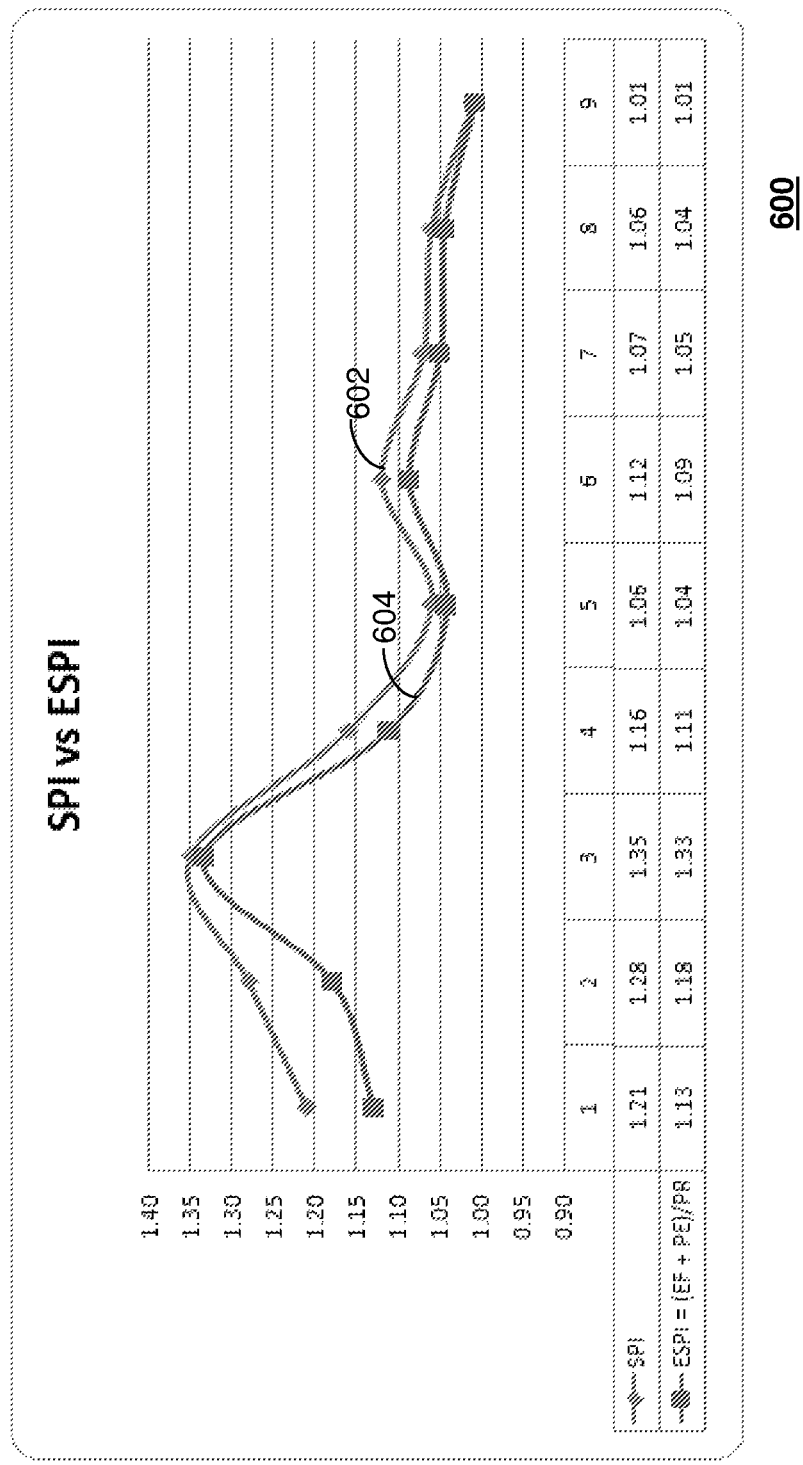
FIG. 6 is a graph 600 showing the comparison between earned schedule performance index and schedule performance index, in accordance with an embodiment of the present invention.

FIG. 6 is a graph 600 showing the comparison between earned schedule performance index and schedule performance index, in accordance with an embodiment of the present invention. Graph 600 includes curve 602 and curve 604 representing values of SPI and ESPI respectively for the project discussed in FIG. 5. Even in this case, it may be observed that the ESPI is usually lower than the SPI and is more realistic.

Thus, the invention describes a computer-implemented method and a system for assessing the progress of a project in terms of its schedule. The method includes receiving project data and based on the project data, calculating a first period (PE) after which a current earned value (EV) was expected to be realized. The method also includes calculating a second period (PR) in which the current EV has been realized. Further, the method includes calculating a fraction component (EF) of a period when the current EV was expected to be realized and finally, calculating an earned schedule performance index (ESPI) based on PE, PR and EF, wherein the ESPI indicates whether the project is on schedule.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A computer-implemented method for assessing the progress of a project in terms of its schedule, the method comprising:
   i. receiving project data from a database; and
   ii. based on the received project data, calculating by a processor:
      a first period (PE) after which a current earned value (EV) was expected to be realized, the first period being calculated in terms of a predefined unit of time;
      a second period (PR) in which the current EV has been realized, the second period being calculated in terms of the predefined unit of time;
      a fraction component (EF) of a period when the current EV was expected to be realized, wherein the EF is calculated as: $EF=(EV-PVp)/(PVw-PVp)$, wherein EV is the earned value, PVp is the previous planned value associated with a period immediately preceding the one in which the current EV was expected to be realized, and PVw is the planned value of the period in which the current EV was expected to be realized; and
      an earned schedule performance index (ESPI) based on PE, PR, and EF, wherein the ESPI indicates whether the project is on schedule.

2. The method as recited in claim 1, wherein the PE is calculated as: $PE=SDp-START+1$, wherein SDp is a status date associated with a previous planned value (PVp) and START is the start date of the project.

3. The method as recited in claim 1, wherein the PR is calculated as: $PR=SD-START+1$, wherein SD is a status date of current status report and START is the start date of the project.

4. The method as recited in claim 1, wherein the ESPI is calculated as: $ESPI=(EF+PE)/PR$.

5. The method as recited in claim 1, wherein the predefined unit of time comprises months, weeks, days, hours, minutes and seconds.

6. A system for assessing the progress of a project, the system comprising:
   i. a database for storing project data; and
   ii. a processor for calculating, based on the stored project data:
      a first period (PE) after which a current earned value (EV) was expected to be realized, the first period being calculated in terms of a predefined unit of time;
      a second period (PR) in which the current EV has been realized, the second period being calculated in terms of the predefined unit of time;
      a fraction component (EF) of a period when the current EV was expected to be realized, wherein the EF is calculated as: $EF=(EV-PVp)/(PVw-PVp)$, wherein EV is the earned value, PVp is the previous planned value associated with a period immediately preceding the one in which the current EV was expected to be realized, and PVw is the planned value of the period in which the current EV was expected to be realized; and
      an earned schedule performance index (ESPI) based on PE, PR and EF, wherein the ESPI indicates whether the project is on schedule.

7. The system as recited in claim 6, wherein the processor calculates the PE as: $PE=SDp-START+1$, wherein SDp is a status date associated with a previous planned value (PVp) and START is the start date of the project.

8. The system as recited in claim 6, wherein the processor calculates the PR as: $PR=SD-START+1$, wherein SD is a status date of current status report and START is the start date of the project.

9. The system as recited in claim 6, wherein the processor calculates the ESPI as: $ESPI=(EF+PE)/PR$.

10. The system as recited in claim 6, wherein the predefined unit of time comprises months, weeks, days, hours, minutes and seconds.

11. The system as recited in claim 6, further comprising a storage module for storing at least calculated values of PE, PR, EF and ESPI.

12. The system as recited in claim 6, further comprising a reporting module for generating reports based on calculated values of PE, PR, EF and ESPI.

* * * * *